May 19, 1942.　　G. W. KUERNER　　2,283,858
DUST COLLECTOR
Filed July 27, 1940
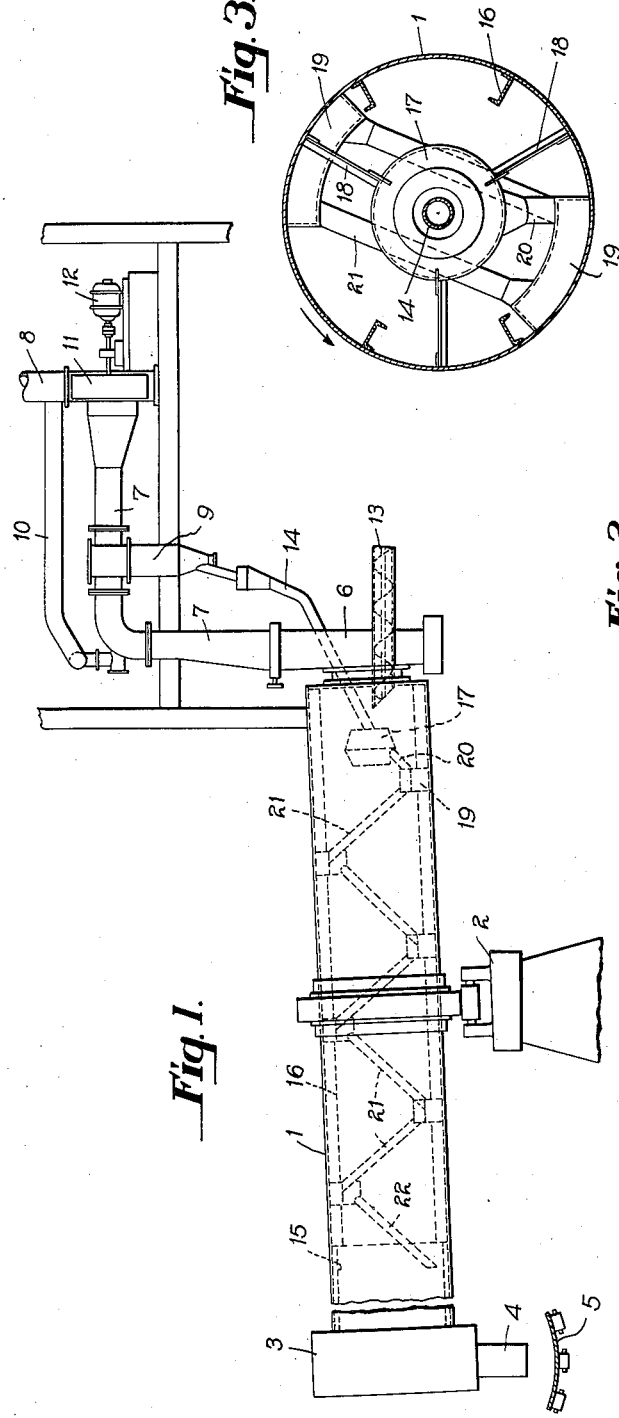
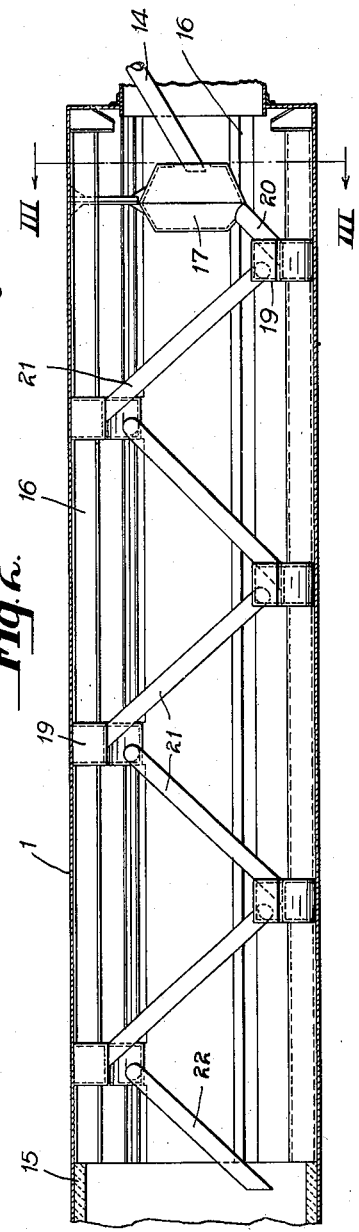
INVENTOR
George W. Kuerner
BY
ATTORNEY Patented May 19, 1942

2,283,858

UNITED STATES PATENT OFFICE 2,283,858

DUST COLLECTOR

George W. Kuerner, Mobile, Ala., assignor to Aluminum Company of America, Pittsburgh, Pa., a corporation of Pennsylvania Application July 27, 1940, Serial No. 347,902

4 Claims. (Cl. 34—102)

This invention relates to improvements in drying materials and particularly to improvements in the kiln drying or calcining of finely divided materials or materials of which a portion is in finely divided or dusty form.

The principal object of the present invention is to provide a method and apparatus for effecting the substantially complete drying of material, all or some of which is in extremely finely divided form in rotary type kilns with a minimum of dust loss. A further object is the provision of a continuously fed rotary kiln drying system of relatively economical construction that will permit the efficient drying of material having a relatively wide variation in the percentage of extremely fine or dusty material as compared with the coarser fraction of the material fed to the drying kiln. A still further object is the provision of a system of the described type which will effect the complete drying of the extremely fine or dusty portion of the kiln feed in the same apparatus and simultaneously with the coarser fraction of the kiln feed, and which will maintain substantially the same proportion of coarse material to a fine material at the discharge end of the kiln as at the feed end. Further objects of the invention will be apparent from the following description and the accompanying drawing.

In the drying or calcining of many different materials, the commonly employed apparatus consists of an elongated cylindrical shell mounted for rotation about its longitudinal axis which is usually inclined from the horizontal to permit the feeding of the material to be dried from the feed end to the discharge end by the force of gravity. The drying is effected by a suitable fuel burning system mounted at the lower or discharge end of the kiln, the heated gases from which move along through the kiln opposite to the direction of the travel of the material being dried to the feed end of the kiln where the gases are usually collected in a suitable stack system and ultimately carried off to the air.

One of the principal problems encountered in the operation of kilns of this type arises when the material or a portion of the material to be dried is in finely divided or dusty form, because at least a portion of the extremely finely divided material will usually be picked up by the gases passing through the kiln and carried out through the stack system. If the finely divided material is allowed to pass out through the stack, it not only constitutes in some instances a serious loss of the material being dried, but in addition results in an undesirable dust discharge into the atmosphere. For this reason, dust collectors are frequently employed between the point of egress of the gases from the kiln and the stack discharge. In the calcining of many types of materials, the dust which is collected in the dust collecting system is not a completely calcined product and requires a separate calcination treatment usually in some special type of apparatus because of its extremely fine nature. Obviously in calcining or drying operations it is preferable to employ dust collectors of the dry type.

If the dust from the dust collecting system is returned to the feed end of the kiln, a large portion of it will be picked up in the stack gases and carried back to the dust collectors, giving rise to a large circulating dust load in the system which may overload the dust collecting apparatus and thereby diminish its efficiency. This is particularly true if the drying kiln is provided with lifters in the feed end of the kiln. Lifters are frequently employed in kilns of the described type when the material to be dried contains relatively large amounts of uncombined water and therefore tends to pack or lump in the kiln. In many kiln installations these lifters do not of necessity extend the full length of the kiln but only extend a relatively short distance from the feed end because the bulk of the uncombined water will be driven off after the material has been fed a relatively short distance into the kiln and the material loses its tendency to pack.

The present invention resides in the provision of a method and apparatus which is effective to reduce the circulating dust load in a kiln installation employing dust collectors by introducing the fine material recovered in the dust collector at a point within the kiln remote from the feed end, thus giving the fine material a substantially reduced period of contact with the drying gases and still giving a substantially complete calcination of all of the material fed through the kiln. The invention may best be described by reference to the accompanying drawing, in which:

Fig. 1 shows a drying or calcining kiln installation with a portion of the length of the kiln cut away;

Fig. 2 shows a longitudinal section through a portion of the kiln; and

Fig. 3 shows a cross section of the kiln taken along the lines III—III of Fig. 2.

In the drawing, 1 is the kiln shell mounted for rotation on suitable supports 2. The kiln is provided with a stationary end closure 3 at its discharge end in which are mounted suitable burners or the like for the production of the drying gases. The end closure 3 is provided with a discharge 4 for the discharge of the dry material from the kiln, for example onto a conveyor belt 5. The feed end of the kiln is provided with a stationary end closure 6 which is adapted to act as a duct for the exhaust gases after they are passed through the kiln. A conduit 7 connects the end closure 6 with a suitable stack 8 which discharges in the atmosphere. Mounted on the conduit 7 is a suitable dry dust collector 9 of any well-known type, such as a cone type dust collector. A duct 10 is provided as a by-pass around the dust collector which may be employed with a suitable valve system to control the recirculation of a portion of the hot stack gases through the dust collector to maintain the required volume through the dust collector for good collecting efficiency. A fan 11, driven by a motor 12, provides a forced draft system to augment the natural stack draft. The material to be dried is introduced into the feed end of the kiln by any well-known means, such as the screw conveyor 13. The dust collected in the dust collectors is fed back into the kiln by discharge from the dust collectors through the conduit 14.

The specific kiln construction shown is provided with a heat resisting lining 15 of fire brick or the like extending from the discharge end of the kiln, at which end the kiln temperature is the highest, through a major portion of the kiln length stopping short of the feed end of the kiln. Suitable lifters, such as the channels 16, extend from the feed end of the kiln to a point adjacent the end of the lining 15.

Mounted within the kiln is a circular receptacle 17 having its axis substantially coincident with the axis of the kiln and attached to the kiln shell 1 by braces 18. The conduit 14 from the duct collector is adapted to discharge the fine material from the dust collector through an axially disposed opening into the receptacle 17 during rotation of the kiln. A plurality of boxes 19 are fixed to the interior of the kiln shell 1 at intervals along the kiln length in staggered relationship and on diametrically opposite sides of a plane bisecting the kiln. Each of the boxes 19 extends about a portion of the kiln periphery and each end of each box is adapted for communication with tubular ducts, such as the ducts 21. The tubular ducts 21 interconnect the oppositely disposed staggered boxes 19, and each duct in successive order along the kiln length is oppositely inclined with respect to the kiln axis and are each connected with those ends of the boxes 19 which lie on the same side of a plane through the center line of the kiln and parallel to the ducts 21. Tubular ducts 20 and 22, disposed in the same relative positions with respect to the boxes 19 as the ducts 21, complete a passage system from the receptacle 17 to the point of discharge on or near the kiln lining.

The operation of this apparatus is as follows. Material from the dust collector 9 is fed through the conduit 14 into the circular box 17, then through the duct 20 into one end of the box 19 nearest the feed end of the kiln. As the kiln is rotated in the direction indicated by the arrow shown in Fig. 3, the material slides through the box 19 to the opposite end of the box into which it has been introduced, and as the kiln is further rotated, it goes through one of the ducts 21 into the next adjacent box away from the feed end of the kiln through which it travels in the same manner as previously described into the next duct 21. The finely divided material recovered in the dust collector is finally discharged through the duct 22 into the kiln at a point adjacent the kiln lining 15.

During the passage of the dust or fine material through the system described, it has practically no contact with the gases passing through the kiln, and therefore during this period it cannot be picked up by the kiln gases. By thus limiting the period of contact with the kiln gases, less of the finely divided material is picked up by the kiln gases. The conduit system receives some heat from the kiln gases and serves to further dry the material being fed therethrough. The dust picked up by the gases is further reduced by discharging the finely divided material from the dust collector into the kiln at a point past the kiln lifters.

It has been found that the above described system of introducing the finely divided material from the dust collectors into the kiln is greatly effective in reducing the circulating dust load in the kiln and dust collector system. As the material collected in the dust collector is fed into the kiln with the coarser material passing through the kiln, the discharge from the kiln will contain substantially the same ratio of extremely fine material to coarse material as the material introduced at the feed end. This is of great advantage as it avoids the necessity for a separate mixing operation in those frequent instances when the material is specified to have a uniform ratio of fine to coarse material. The specific apparatus described is simple in construction and utilizes the kiln drive to move the fine material from the dust collector from the feed end of the kiln to the point of discharge within the kiln.

While the invention has been described in connection with the operation of a specific apparatus, it is to be understood that there is no intention of excluding any equivalent or obvious variation of the invention as set forth in the appended claims.

I claim:

1. Apparatus for drying material comprising a kiln adapted for the passage of material therethrough, means for feeding the material to be dried into one end of said kiln, means at the opposite end of the kiln for discharging dried material, means at the discharge end of said kiln for supplying drying gases for passage through said kiln in contact with the material being dried in a direction opposite to the movement of the material, a dust collector adapted to recover the fine material carried by the gases leaving the feed end of the kiln, and means comprising a passage system located within the kiln adapted to receive the fine material recovered in the dust collector and convey said material from the feed end of the kiln through a substantial portion of the kiln length while maintaining said material substantially out of contact with the drying gases, said passage system being adapted to discharge said fine material within the kiln at a point remote from the feed end to provide a reduced period of contact of said fine material with the drying gases.

2. Apparatus for drying material comprising a rotary kiln adapted for the passage of material therethrough, means for feeding the material to be dried into one end of said kiln, means at the opposite end of the kiln for discharging dried material, means at the discharge end of said kiln for supplying drying gases for passage through said kiln in contact with the material being dried in a direction opposite to the movement of the material, a dust collector adapted to recover the fine material carried by the gases leaving the feed end of the kiln, and means comprising a passage system located within the kiln adapted to receive the fine material recovered in the dust collector and convey said material by the rotation of the kiln from the feed end of the kiln through a substantial portion of the kiln length while maintaining said material substantially out of contact with the drying gases, said passage system being adapted to discharge said fine material within the kiln at a point remote from the feed end to provide a reduced period of contact of said fine material with the drying gases.

3. Apparatus for drying material comprising a rotary kiln adapted for the passage of material therethrough, means for feeding the material to be dried into one end of said kiln, means at the opposite end of the kiln for discharging dried material, a plurality of lifters located near the feed end of said kiln, means at the discharge end of said kiln for supplying drying gases for passage through said kiln in contact with the material being dried in a direction opposite to the movement of the material, a dust collector adapted to recover the fine material carried by the gases leaving the feed end of the kiln, and means comprising a passage system located within the kiln adapted to receive the fine material recovered in the dust collector and convey said material from the feed end of the kiln through a substantial portion of the kiln length while maintaining said material substantially out of contact with the drying gases, said passage system being adapted to discharge said fine material within the kiln at a point remote from the feed end and beyond said lifters to provide a reduced period of contact of said fine material with the drying gases.

4. Apparatus for drying material comprising a kiln adapted for the passage of material therethrough, means for feeding the material to be dried into one end of said kiln, means at the opposite end of the kiln for discharging dried material, means at the discharge end of said kiln for supplying drying gases for passage through said kiln in contact with the material being dried in a direction opposite to the movement of the material, a dust collector adapted to recover the fine material carried by the gases leaving the feed end of the kiln, and means comprising a passage system located within the kiln adapted to receive the fine material recovered in the dust collector and convey said material from the feed end of the kiln through a substantial portion of the kiln length while maintaining said material substantially out of contact with the drying gases, said passage system being adapted to discharge said fine material within the kiln and adjacent the kiln lining at a point remote from the feed end to provide a reduced period of contact of said fine material with the drying gases.

GEORGE W. KUERNER.